(12) United States Patent
Aufiero (10) Patent No.: US 12,044,200 B2
(45) Date of Patent: Jul. 23, 2024

(54) SUBMERSIBLE HYDRAULIC ASSEMBLY WITH FACILITATED DEPLOYMENT, FACILITATED MAINTENANCE AND IMPROVED TORSIONAL STIFFNESS FOR AN ENERGY STORAGE PLANT, ENERGY STORAGE PLANT COMPRISING SAID SUBMERSIBLE HYDRAULIC ASSEMBLY, METHOD FOR PERFORMING MAINTENANCE OPERATIONS ON A ENERGY STORAGE PLANT AND METHOD FOR ASSEMBLING/DISASSEMBLING AN ENERGY STORAGE PLANT

(71) Applicant: Sizable Energy S.r.l., Milan (IT)

(72) Inventor: Manuele Aufiero, Milan (IT)

(73) Assignee: Sizable Energy S.R.L., Milan (IT)

( * ) Notice: Subject to any disclaimer, the term of this patent is extended or adjusted under 35 U.S.C. 154(b) by 0 days.

(21) Appl. No.: 18/037,717

(22) PCT Filed: Nov. 19, 2021

(86) PCT No.: PCT/IB2021/060755
§ 371 (c)(1),
(2) Date: May 18, 2023

(87) PCT Pub. No.: WO2022/107069
PCT Pub. Date: May 27, 2022

(65) Prior Publication Data
US 2023/0407833 A1    Dec. 21, 2023

(30) Foreign Application Priority Data

Nov. 20, 2020    (IT) .................. 102020000027921

(51) Int. Cl.
*F03B 13/06*    (2006.01)

(52) U.S. Cl.
CPC .......... *F03B 13/06* (2013.01); *F05B 2230/60* (2013.01); *F05B 2230/70* (2013.01);
(Continued)

(58) Field of Classification Search
CPC ............ F03B 3/10; F03B 13/06; F03B 13/10
See application file for complete search history.

(56) References Cited

U.S. PATENT DOCUMENTS

| 2012/0257955 A1* | 10/2012 | Rooney ................. F03B 17/061 |
| | | 415/7 |
| 2019/0186458 A1 | 6/2019 | Obermeyer et al. |
| 2020/0088157 A1 | 3/2020 | Meason et al. |

FOREIGN PATENT DOCUMENTS

| CA | 2467287 A1 | 11/2005 |
| WO | WO-0192718 A1 * 12/2001 | .............. F03B 13/10 |

(Continued)

OTHER PUBLICATIONS

PCT International Search Report and Written Opinion dated Feb. 2, 2022 for PCT Application No. PCT/IB2021/060755.

(Continued)

*Primary Examiner* — Jonathan R Matthias
(74) *Attorney, Agent, or Firm* — McCarter & English, LLP (57) ABSTRACT

A submersible hydraulic assembly for an energy storage plant is provided that includes at least one hydraulic machine and at least one first buoyancy chamber filled with at least one first buoyancy element. The at least one first buoyancy chamber is generally configured in such a way that the hydraulic machine is substantially neutrally buoyant when submerged in an environmental liquid. An energy storage plant is also provided as well as a method for (Continued)

performing maintenance operations on an energy storage plant and a method for assembling/disassembling an energy storage plant.

21 Claims, 7 Drawing Sheets

(52) U.S. Cl.
CPC ....... *F05B 2230/80* (2013.01); *F05B 2240/97* (2013.01); *F05B 2260/422* (2020.08)

(56) References Cited

FOREIGN PATENT DOCUMENTS

| | | | |
|---|---|---|---|
| WO | WO-2016040731 A1 * | 3/2016 | .............. F03B 13/06 |
| WO | WO 2020/084150 A2 | 4/2020 | |

OTHER PUBLICATIONS

PCT/IB2021/060755, Nov. 19, 2021, WO 2022/107069 A1 publishe May 27, 2022.

* cited by examiner

SUBMERSIBLE HYDRAULIC ASSEMBLY WITH FACILITATED DEPLOYMENT, FACILITATED MAINTENANCE AND IMPROVED TORSIONAL STIFFNESS FOR AN ENERGY STORAGE PLANT, ENERGY STORAGE PLANT COMPRISING SAID SUBMERSIBLE HYDRAULIC ASSEMBLY, METHOD FOR PERFORMING MAINTENANCE OPERATIONS ON A ENERGY STORAGE PLANT AND METHOD FOR ASSEMBLING/DISASSEMBLING AN ENERGY STORAGE PLANT

CROSS-REFERENCE TO RELATED APPLICATIONS

This Patent Application is a 35 U.S.C. § 371 National Stage filing of International Application No. PCT/IB2021/060755, filed on Nov. 19, 2021, which Application claims priority from Italian Patent Application No. 102020000027921 filed on Nov. 20, 2020, the entire disclosures of which is are incorporated herein by reference.

TECHNICAL FIELD

The present invention relates to a submersible hydraulic assembly for an energy storage plant and to an energy storage plant comprising said submersible hydraulic assembly. The invention further relates to a method for performing maintenance operations on an energy storage plant and to a method for assembling/disassembling an energy storage plant.

BACKGROUND

As is known, energy storage plants are essential for storing excess energy produced by intermittent energy sources (such as solar, wind energy plants) and other renewables, or excess energy produced by continuous base-load sources (such as coal or nuclear). Energy storage plants, in fact, are used for saving energy for periods of higher demand.

One of the most common kinds of energy storage plants is the hydroelectric energy storage plant.

Hydroelectric energy storage plants store energy in the form of gravitational potential energy of a working fluid (generally water), pumped from a lower elevation reservoir to a higher elevation (generally a reservoir too).

In use, the surplus electric power is used to run a pumping system to store the working fluid; while during periods of high electrical demand, the stored water is released and a turbine generating system produces electric power.

Normally, these hydroelectric storage plants are arranged onshore exploiting elevation differences in mountains or hills. Recently, off-shore adoption of the pumped-hydro energy storage concept in seas/oceans or in lakes is being considered.

Deployment, maintenance and service operations on this new kind of offshore storage plants are of course not simple as most of the components are submersed underwater.

To check or fix one component of the plant, it is often necessary to move heavy and cumbersome assemblies out of the body of water, and then to move them to a specific site in order to perform maintenance operations.

In other words, even if the problem is on a single component, at least a great portion of the plant should be dismantled and moved. In addition, offshore maintenance operations can be expensive and short maintenance intervals should be avoided.

SUMMARY

The object of the present invention is therefore to provide a submersible hydraulic assembly for an energy storage plant which enables avoiding or at least mitigating the described drawbacks.

In particular, it is an object of the present invention to provide a submersible hydraulic assembly for an energy storage plant, which simplifies maintenance operations, reduces its correlated costs and extends maintenance intervals.

According to the present invention, there is provided a submersible hydraulic assembly for an energy storage plant comprising:

at least one hydraulic machine;

at least one first buoyancy chamber filled with at least one first buoyancy element; the first buoyancy chamber being configured in such a way that the hydraulic machine is substantially neutrally buoyant when submerged in an environmental liquid.

A further object of the present invention is to provide an energy storage plant configured so as to limit and simplify maintenance operations and reduce its correlated costs.

According to the present invention, there is provided an energy storage plant as claimed in claim 16.

It is a further object of the present invention to provide a method for performing maintenance operations on an energy storage plant able to simplify maintenance operations and reduce its correlated costs.

According to the present invention, there is provided a method for performing maintenance operations on an energy storage plant according to claim 20.

Finally, it is a further object of the present invention to provide a method for assembling/disassembling an energy storage plant, able to simplify assembling/disassembling operations and reduce its correlated costs.

According to the present invention, there is provided a method for assembling/disassembling an energy storage plant according to claim 21.

BRIEF DESCRIPTION OF THE DRAWINGS

The present invention will now be described with reference to the accompanying drawings, which illustrate some non-limitative embodiment, in which.

DETAILED DESCRIPTION OF EXEMPLARY EMBODIMENTS

Figure 1:
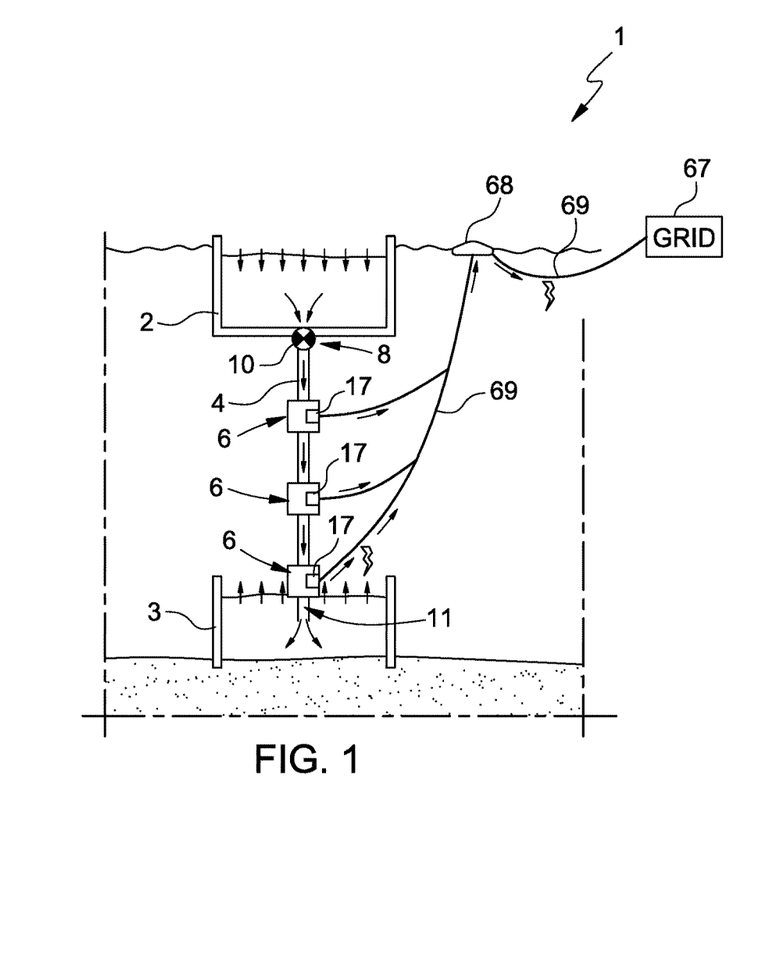
FIG. 1 is a schematic representation of an energy storage plant according to the present invention, with parts removed for clarity, in a discharging operation mode.
Figure 2:
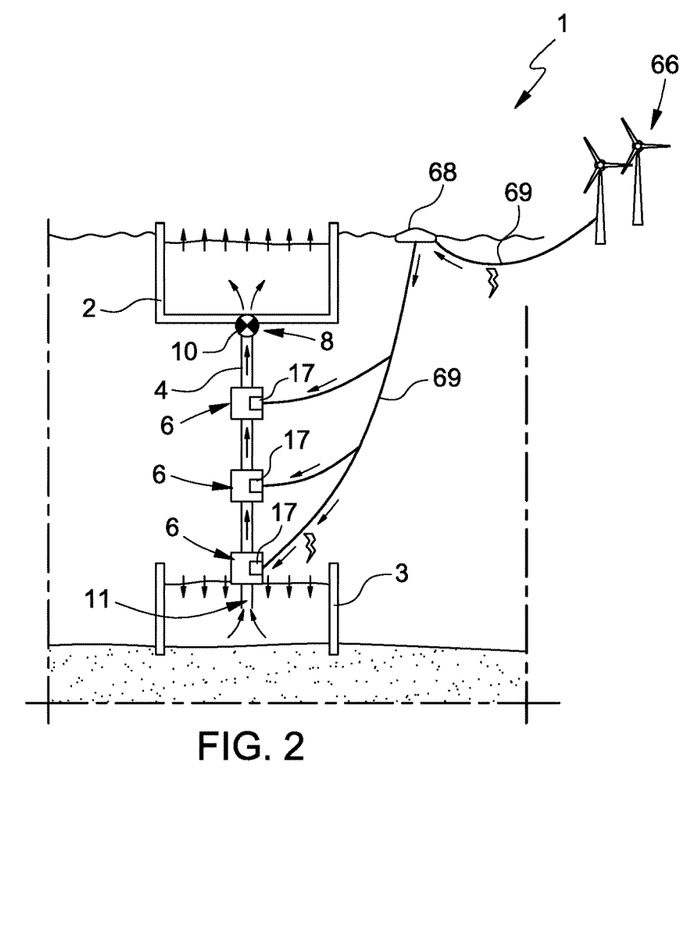
FIG. 2 is a schematic representation of an energy storage plant, with parts removed for clarity, according to the present invention in a charging operation mode.

In FIGS. 1 and 2 reference numeral 1 indicates an energy storage plant according to the present invention.

The energy storage plant 1 comprises at least one head reservoir 2, at least one bottom reservoir 3, at least one connecting conduit 4 fluidly connecting the head reservoir 2 and the bottom reservoir 3, and at least one submersible hydraulic assembly 6 arranged along the connecting conduit 4.

The head reservoir 2 and the bottom reservoir 3 are configured to store a working liquid.

The head reservoir 2 is arranged at a first height and the bottom reservoir 3 is arranged at a second height lower than the first height.

The bottom reservoir 3 is submersed in a body of environmental liquid, generally water in marine/natural basin application (sea water or lake water). In the following, the body of environmental liquid will be defined as body of water.

In the non-limitative example here disclosed and illustrated, the bottom reservoir 3 lays on the bed of the body of water.

The head reservoir 2 can be buoyant or can be fixed on shore or can be submersed too. Preferably, the head reservoir 2 is connected to cables (not shown in the attached figures) coupled to the bed of the body of water or to any other fixed structure (natural or artificial) to compensate movements due to the body of water or due to the changes of load.

In the non-limitative example here disclosed and illustrated, the working liquid is denser than the water of the body of water. According to a variant not shown the working liquid can be less dense than the water of the body of water.

Preferably, the liquid arranged in the head reservoir 2 and in the bottom reservoir 3 has a pressure very close to the one of the surrounding environment. This can be achieved, for example, by inletting or outletting liquid to compensate pressure changes. In this way, advantages in terms of choice of materials and of the structures of the reservoirs to be used are evident. Both head reservoir 2 and bottom reservoir 3 can be selectively connected with the body of water, preferably to regulate the pressure inside them.

Head reservoir 2 is provided with one opening 8 connected to the connecting conduit 4 and, preferably, with one valve 10 arranged at the opening 8 to regulate the flow of working fluid.

Bottom reservoir 3 is provided with one opening 11 connected to the connecting conduit 4. In the connecting conduit 4 the working liquid flows up and down through the at least one hydraulic assembly 6.

In the non-limiting example here disclosed and illustrated, the energy storage plant 1 comprises a plurality of hydraulic assemblies 6 arranged in series along the connecting conduit 4.

Figure 3:
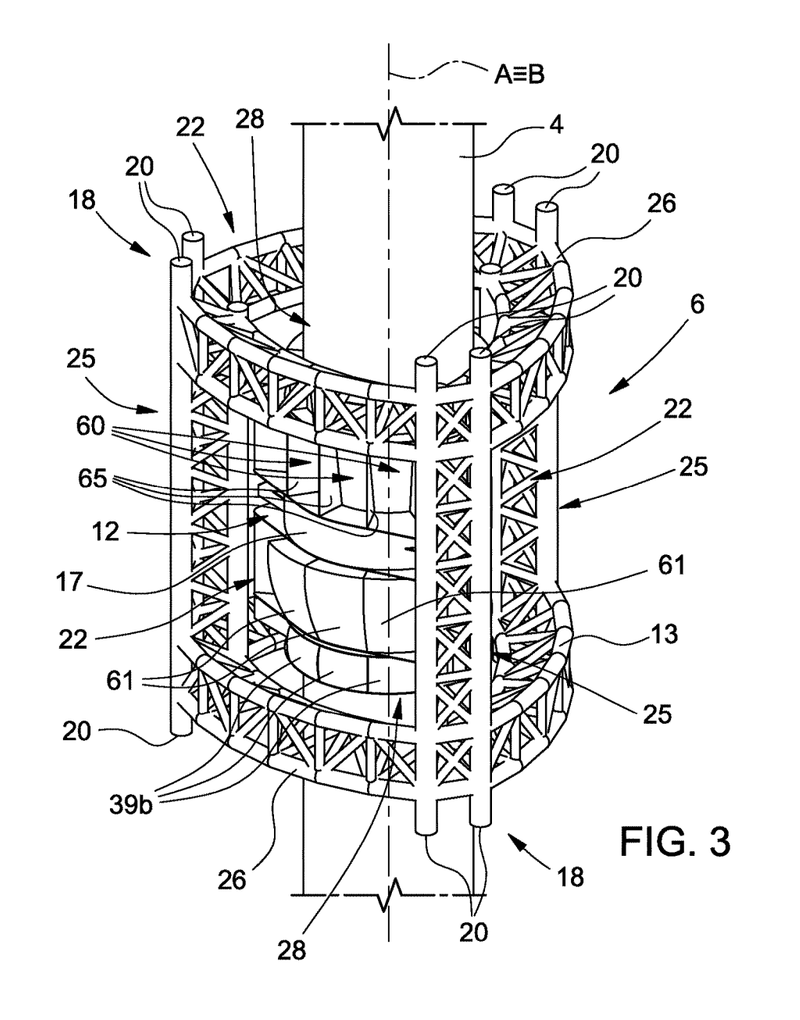
FIG. 3 is a perspective schematic representation of a submersible hydraulic assembly for an energy storage plant, with parts removed for clarity, according to the present invention.

With reference to FIG. 3, each hydraulic assembly 6 comprises at least one hydraulic machine 12 (better visible in the following figures) and a frame 13 configured to house the hydraulic machine 12.

Preferably, the hydraulic assembly 6 comprises also a motor/generator 17 (not illustrated in detail), configured to selectively supply mechanical energy (motor mode) or to convert mechanical energy into electricity (generator mode).

Figure 4:
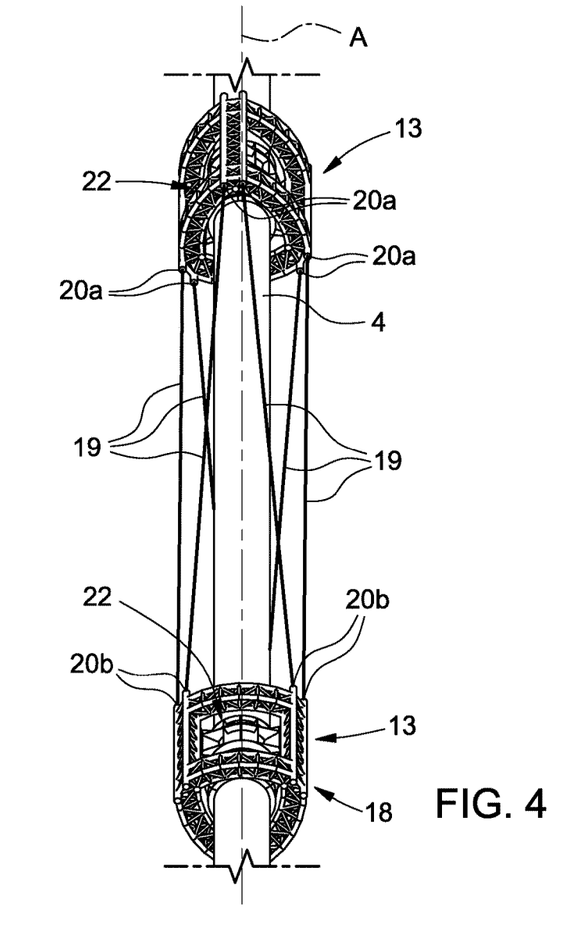
FIG. 4 is a perspective schematic representation of a first detail of the energy storage plant showing a possible connection between submersible hydraulic assemblies, with parts removed for clarity, according to the present invention.

With reference to FIG. 4, each frame 13 is provided with at least two opposite ends 18, each of which is connected by at least one cable or chain 19 to a respective frame 13 of an adjacent hydraulic assembly 6 or to the head reservoir 2 or to the bottom reservoir 3 or to an intermediate structure coupled to the head reservoir 2 or to the bottom reservoir 3 or to other support or mooring structures. Cable or chain 19 is normally tensioned to provide rigidity to the structure composed by the connecting conduit 4 and by the hydraulic assemblies 6. The connecting conduit 4 extends substantially along a longitudinal axis A. The longitudinal axis A is preferably arranged vertically. However, it is clear that the longitudinal axis can move from the vertical position, for example due to the wave motion of the body of water in which the connecting conduit 4 is submersed.

Torsional stiffness is of paramount importance for a safe and reliable operation of the energy storage plant. In fact, the hydraulic assemblies 6 might be subject to perturbing forces, either internal (e.g., due to the interaction with the fluid flow, during transient operations) or external (e.g., due to marine currents). Vertical and horizontal displacements of the hydraulic assemblies 6 are readily counteracted by the tension of the cables or chains 19. In case of simple vertical connections of the hydraulic assemblies 6, no torsional restoring forces are generated until a significant rotation of the hydraulic assemblies 6 is reached. This might give rise to periodic oscillatory movements with detrimental effects on the reliability of the plant.

Therefore, in order to suppress torsional movements, the ends of each cable or chain 19 are connected to respective anchoring points 20 of adjacent structures (i.e. frames 13 or the head reservoir 2 or the bottom reservoir 3 or an intermediate structure coupled to the head reservoir 2 or the bottom reservoir 3 or other support or mooring structures), which are not axially aligned one with respect to the other.

In other words, as illustrated in FIG. 4, one end of the cable or chain 19 is connected to a first anchoring point 20a of a first frame 13 and the other end of the cable or chain 19 is connected to a second anchoring point 20b of a second frame 13 axially (e.g vertically) adjacent to the first frame 13. The second anchoring point 20b and the first anchoring point 20a are not aligned along the longitudinal axis A and are shifted one another.

Preferably, the anchoring points 20a 20b are selected so as at least two cables or chains 19 connecting two axially adjacent frames 13 (i.e., frames 13 that are adjacent along the same connecting conduit 4) have different inclinations in order to ensure a restoring torque when a torsion is applied to any of the frames 13. More preferably, at least two cables or chains 19 that are connected to neighbouring anchoring points 20 on a same end 18 of the frame 13 have different inclinations. With the expression "neighbouring anchoring points" is intended anchoring points 20 whose distance is small compared to the size of the frame 13, for instance anchoring points 20 whose distance is less than 20% (preferably 10%) the dimension of the frame 13 along a direction orthogonal to the longitudinal axis A.

This way, in nominal conditions, the non-vertical mechanical loads on the frame 13 are limited thanks to the opposed lateral loads on neighbouring anchoring points 20. More preferably, the inclination of at least two cables or chains 19 that are connected to neighbouring anchoring points 20 of the same end 18 is substantially opposite in order to produce a substantially zero net torque in resting conditions, while ensuring a restoring torque when a torsion is applied to any of the frames 13. Moreover, in this way, in nominal conditions, the structures of the frame 13 are mainly subject to vertical loads, and the lateral loads required for the torsional stability are limited to a small part of the area of the end 18 of the frames 13. More preferably, each cable or chain 19 connecting two axially adjacent hydraulic assemblies 6 (e.g in the vertical direction) has an inclination substantially opposite to the inclination of another cable or chain 19 arranged at his side (e.g. in the horizontal direction).

Preferably, the frames 13 of the hydraulic assemblies 6 are rotated with respect to the axially adjacent frames 13 of an angle comprised between 30° and 100°, preferably substantially 60°.

The selected range of angle of rotation between the frames 13 of axially (e.g., vertically) adjacent hydraulic assemblies 6 represents the optimal compromise between the torsional dynamic response achieved, the minimum radial distance between the anchoring points 20 such that the cables or chains 19 do not intersect the connecting conduit 4 in operation, and the maximum tension exerted on the cables or chains 19.

With reference to FIGS. 3 and 4, the frame 13 has preferably a structure, which has a rotational symmetry.

In the non-limiting example here disclosed and illustrated, the frame 13 has a structure having a rotational symmetry of 120°. According to a variant not shown, the rotational symmetry can be of 180° or 90°.

The frame 13 is configured to define at least one window 22 through which the hydraulic machine 12 can be extracted.

In the non-limitative example here disclosed and illustrated, the frame 13 comprises three windows 22 arranged at 120°.

In other words, the frame 13 is designed so as to allow for an easy access to the hydraulic machine 12 and, at the same time, to define a support structure for the hydraulic machine 12.

The 120° rotational symmetry of the frame 13 represents the optimal compromise between the structure torsional stiffness and the required structure size for leaving at least one window 22 to extract the hydraulic machine 12.

In combination with the 120° rotational symmetry of the frame 13, a 60° angle of rotation of one frame 13 with respect to the axially adjacent frames 13 represents a further improvement of the compromise between the torsional dynamic response achieved, the radial distance between the anchoring points 20 such that the cables or chains 19 do not intersect the connecting conduit 4 in operation, and the maximum tension exerted on the cables or chains 19.

Preferably, the frame 13 comprises three uprights 25, which are, in use, axially arranged and two cross bars 26 arranged substantially at the ends 18 of the frame 13 and preferably orthogonal to the uprights 25. The uprights 25 and the cross bars 26 are arranged so as to define the windows 22.

Each upright 25 is provided with two anchoring points 20 at each end 18. Therefore, in the non-limiting example here disclosed and illustrated, the frame 13 is provided with six anchoring points 20 at each end 18 of the frame 13.

Each anchoring point 20 is connected to a respective cable or chain 19.

The cross bars 26 are preferably convex to allow for the insertion and connection of the connecting conduit 4, while limiting the overall radial dimensions of the frame 13.

In the non-limitative example, the cross bars 26 are arranged to substantially define, on a plane orthogonal to axis A, a Reuleaux triangle.

In the non-limiting example here disclosed and illustrated, the frame 13 is dimensioned to house also at least partially the connecting conduit 4. In particular, coupling portions 28 of connecting conduit 4, which are coupled to the hydraulic machine 12 are preferably housed in the frame 13 to support the weight (or the buoyancy) of the connecting conduit 4 and ensure the transfer of axial loads from the connecting conduit 4, through the frame 13 to the chains or cables 19.

According to a variant not shown, the frame 13 comprises buoyancy chambers, which are defined by buoyancy bodies coupled to the frame itself or by cavities obtained in hollow structures, for example of the uprights or of the cross bars.

The hydraulic machine 12 is preferably fixed to the frame 13, for instance by means of metal sheets (not illustrated in the attached figures). Preferably, the metal sheets connect the inner portion of the uprights 25 to the hydraulic machine 12.

The hydraulic machine 12 of the hydraulic assembly 6 can be selected in the group comprising a pump, a turbine, a reversible pump/turbine.

In the example here disclosed and illustrated, the hydraulic machine 12 is a reversible pump/turbine. In other words, hydraulic machine 12 can act as a pump or, alternatively, as a turbine.

Preferably, the hydraulic machine 12 is a reversible axial flow pump/turbine directly connected to the motor/generator 17. Advantageously, the axial flow pump/turbine can be arranged directly along the connecting conduit 4 without the need of flow deviations.

The hydraulic machine 12 extends along an axis B which, in use, is substantially coincident with the longitudinal axis A.

In the non-limiting example here disclosed and illustrated, axis B is also the rotational axis of the hydraulic machine 12.

The pump/turbine 12 is preferably of the rim-driven type and is shaft-less.

Figure 5:
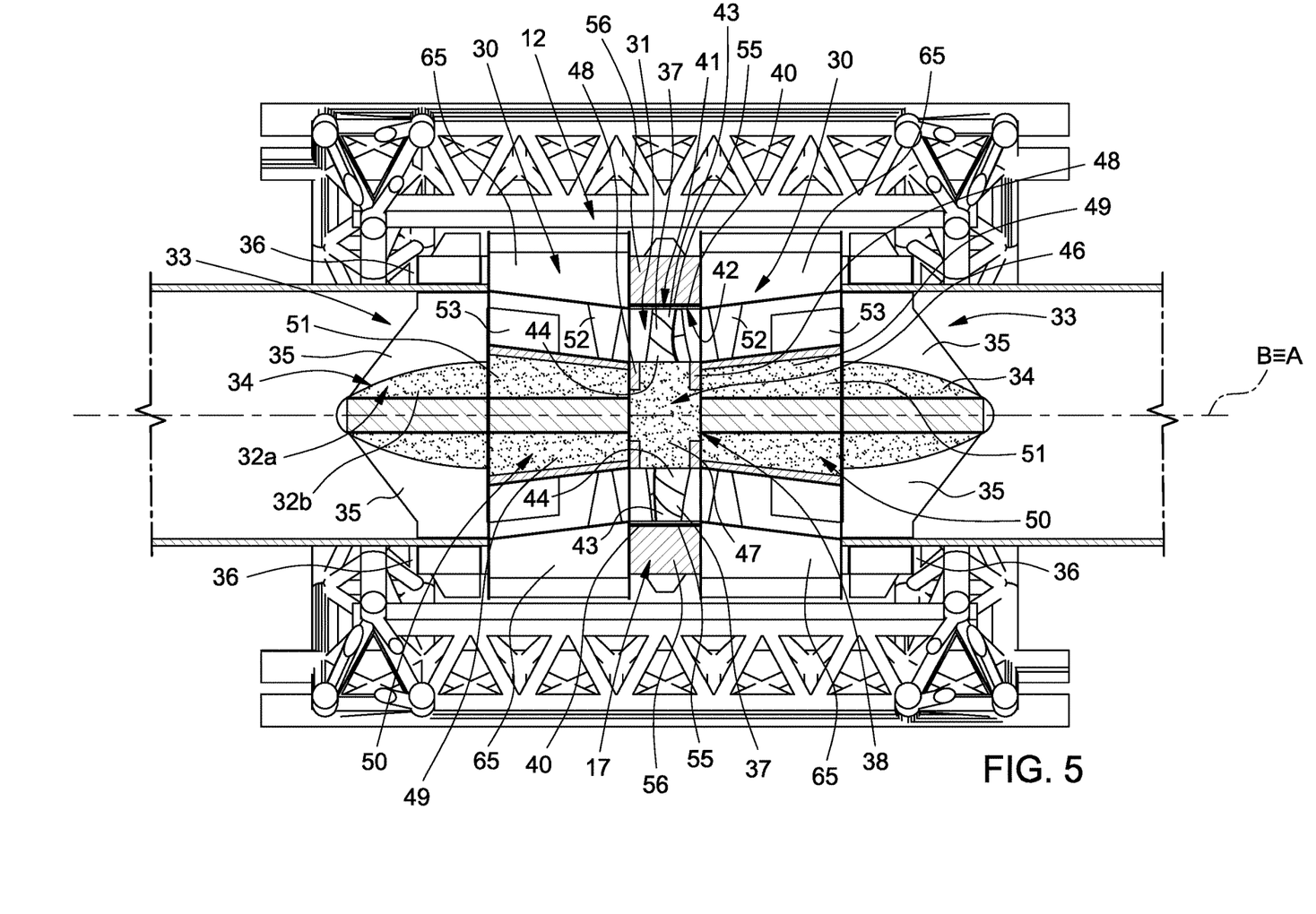
FIG. 5 is a section view, with parts removed for clarity, of the submersible hydraulic assembly of FIG. 3.
Figure 6:
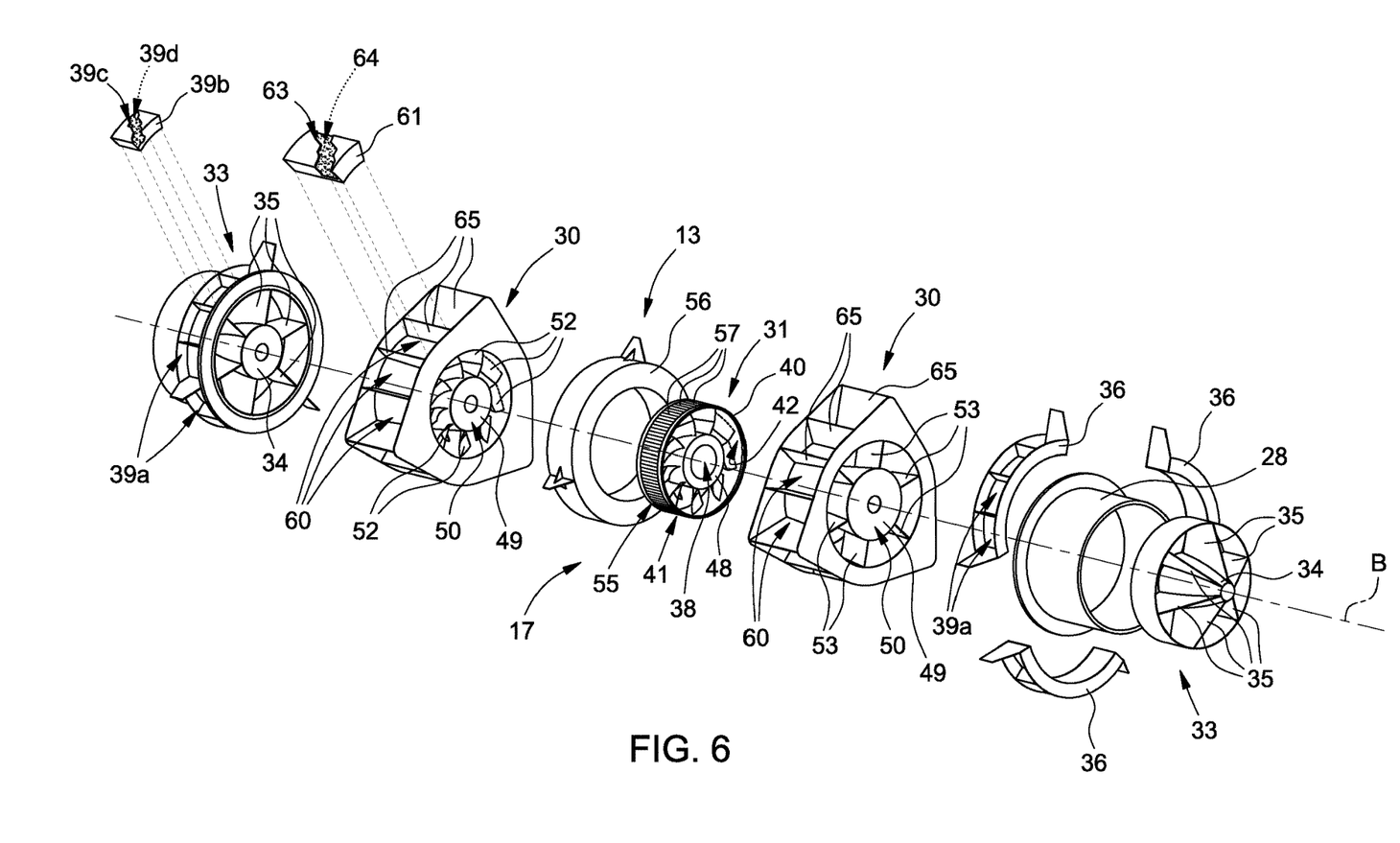
FIG. 6 is an exploded view, with parts removed for clarity, of the submersible hydraulic assembly of FIG. 3.

With reference to FIGS. 5 and 6, the hydraulic machine 12 comprises two distributors 30 and an impeller 31 arranged between the distributors 30. The distributors 30 and the impeller 31 are coaxially arranged.

Preferably, each distributor 30 of the hydraulic machine 12 is connected to a respective coupling portion 28 of the connecting conduit 4 by a connector 33. The connectors 33 here disclosed and illustrated also perform the function of guiding the flow of the working liquid towards the distributors 30. In particular, each connector 33 is provided with a hollow central body 34, preferably ogive-shaped, fixed struts 35 annularly arranged about the hollow central body 34 and at least two outer flanges 36 (three in the example here illustrated) configured to clamp the coupling portion 28 of the connecting conduit 4.

The hollow central body 34 defines a buoyancy chamber 32a, that can be filled with a buoyancy element 32b. In the non-limiting example here disclosed and illustrated, the buoyancy element 32b in the buoyancy chamber 32a is a polymer foam, preferably polyurethane foam.

Preferably, each connector 33 is also provided with a plurality of outer seats 39a able to house respective outer buoyancy bodies 39b (only one visible in FIG. 6). The outer seats 39a are preferably defined on the outer face of the outer flanges 36. Each outer buoyancy body 39b is able to define a connector buoyancy chamber 39c, which can be filled with a buoyancy element 39d (not well visible).

In the example here disclosed and illustrated, only one outer buoyancy body 39b is housed in one of the outer seats 39a.

In the non-limiting example here disclosed and illustrated, outer buoyancy bodies 39b are defined by water-tight buoyant compartments. The buoyancy element 39d is preferably a polyurethane foam.

Outer buoyancy bodies 39b are preferably made of a material able to support great pressures underwater. Preferably, the outer buoyancy bodies 39b are made of polyethylene.

The impeller 31 comprises a plurality of blades 37 radially arranged with respect to axis B.

The impeller 31 is preferably shaft-less and comprises a hollow hub 38, which is centrally arranged in the impeller 31.

In particular, the impeller 31 comprises an annular casing 40 provided with an outer surface 41 and an inner surface 42. The blades 37 protrude radially from the inner surface 42 of the annular casing 40. Blades 37 have one end 43 rigidly coupled to the annular casing 40 and one radially opposite end 44. In the example here illustrated, the radially opposite end 44 is coupled to the hollow hub 38.

The hollow hub 38 defines a buoyancy chamber 46, which can be filled with a buoyancy element 47.

In the non-limiting example here disclosed and illustrated, the buoyancy element 47 is a polymer foam, preferably polyurethane foam.

In the non-limiting example here disclosed and illustrated, the hollow hub 38 houses also two annular thrust bearings 48, which are arranged at the opposite axial ends of the hollow hub 38, facing respective central fixed bodies 49 of the distributors 30.

Further bearings (not illustrated) are radially arranged.

Each distributor 30 is provided with a respective central fixed body 49, which is preferably hollow to define a buoyancy chamber that can be filled with a buoyancy element 51. In the non-limiting example here disclosed and illustrated, the buoyancy element 51 is a polymer foam, preferably polyurethane foam.

Distributors 30 are provided with guide vanes 52 (preferably regulating vanes) arranged in an annular channel and opportunely oriented to give the required direction to the working liquid flow towards the impeller 31. The distributors 30 are also provided with fixed radial supports 53, which will be described later in detail.

Advantageously, the buoyancy chamber 46 defined by hollow hub 38 is able to reduce the axial load acting on the bearings (not illustrated) of the hydraulic machine 12 in nominal operating conditions.

With reference to FIG. 6, the motor/generator 17 is arranged about the impeller 31.

In particular, the motor/generator 17 comprises a rotor 55 coupled to the impeller 31 and an annular stator 56 arranged, at a distance, about the rotor 55.

The rotor 55 comprises a plurality of permanent magnets 57, while the stator 56 comprises a plurality of coils (not illustrated).

Permanent magnets 57 are arranged on the outer surface 41 of the impeller 31. In particular, permanent magnets 57 are evenly distributed along the outer surface 41 and parallel one to another.

Preferably the permanent magnets 57 are arranged axially with respect to the axis B of the hydraulic machine 12.

Referring to FIGS. 3, 5 and 6, the hydraulic assembly 6 comprises also a plurality of seats 60 able to house respective buoyancy bodies 61.

Each buoyancy body 61 is able to define a buoyancy chamber 63, which can be filled with a buoyancy element 64.

In the example here disclosed and illustrated, only some buoyancy bodies 61 are housed in the seats 60.

Preferably the seats 60 are arranged about at least one of the distributors 30 and, preferably, also about at least one of the connectors 33.

Seats 60 are preferably defined by axial walls 65 protruding radially from the outer faces of the distributors 30 and/or the connectors 33.

Some of the axial walls 65 arranged about the distributors 30 are positioned as an extension of fixed radial supports 53. Seats 60 and buoyancy bodies 61 are designed to define buoyancy chambers 63 dimensioned to house an overall volume of buoyancy element 64 so as the hydraulic machine 12 is substantially neutrally buoyant when submerged in the body of water. This effect can improve, as can be detailed later, maintenance operations on the hydraulic machine 12.

In the non-limiting example here disclosed and illustrated wherein also the hollow bodies 38, 49 inside the hydraulic machine 12 defines buoyancy chambers 46, 50, the dimensioning of the buoyancy bodies 61 takes into account also the volumes of the buoyancy chambers 46, 50.

Analogously, outer seats 39a and outer buoyancy bodies 39b are designed to define buoyancy chambers 39c dimensioned to house an overall volume of buoyancy element 39d so as the hydraulic assembly 6 is substantially neutrally buoyant when submerged in the body of water. In the non-limiting example here disclosed and illustrated wherein also the hollow bodies 32 of the connectors 33 defines buoyancy chambers 32a the dimensioning of the outer buoyancy bodies 39b takes into account also the volumes of the buoyancy chambers 32a.

This effect can improve, as can be detailed later, assembling and disassembling operations on the plant 1.

With the expression "substantially neutral buoyant" is intended the condition at which the hydraulic machine 12 and/or the hydraulic assembly 6 has an average density which is substantially equal to the density of the body of water in which the hydraulic machine 12 and/or the hydraulic assembly 6 is immersed. In this way, the buoyant force substantially balances the force of gravity that would otherwise cause the object to sink (if the density of the hydraulic machine 12 and/or the hydraulic assembly 6 is greater than the density of the body of water in which it is immersed) or rise (if it is less).

With the expression "substantially equal to the density of the body of water in which the hydraulic machine 12 and/or the hydraulic assembly 6 is immersed" is intended that the overall average density of the hydraulic machine 12 and/or the hydraulic assembly 6 is comprised in the range ±10% of the density of the body of water (i.e. with a margin of error of 10%).

In the non-limiting example here disclosed and illustrated, buoyancy bodies 61 are defined by water-tight buoyant compartments. The buoyancy element 64 is preferably a polyurethane foam.

Buoyancy bodies 61 are preferably made of a material able to support great pressures underwater. Preferably, the buoyancy bodies 61 are made of polyethylene.

As the connecting conduit 4 is preferably made of a light material, (for example high density polyethylene), when filled with the environmental liquid, the connecting conduit 4 is substantially neutrally buoyant too.

If the connecting conduit 4 and the hydraulic assemblies 6 are neutrally buoyant in the environmental liquid, also the entire assembled group comprising the connecting conduit 4 and the hydraulic assemblies 6 arranged along the connecting conduit 4 is neutrally buoyant when the connecting conduit 4 is filled with the environmental liquid.

According to a variant, the buoyancy chambers of the hydraulic assemblies can be dimensioned so as the entire assembled group comprising the connecting conduit 4 and the hydraulic assemblies 6 arranged along the connecting conduit 4 is substantially neutrally buoyant when the connecting conduit 4 is filled with the environmental liquid. In other words, the buoyancy of the entire assembled group is obtained by the dimensioning of the buoyancy chambers of the hydraulic assemblies independently form the material of the connecting conduit.

With reference again to FIGS. 1 and 2, in use, energy is stored when the working liquid is pumped upward, if the working liquid is denser than the environmental liquid, or downward, if the environmental liquid is denser than the working liquid.

In the non-limitative example here disclosed and illustrated, the working liquid is denser than the body of water. Therefore, energy is stored when the working liquid is pumped upward (as illustrated in FIG. 2) and energy is released when the working liquid is let flowing downward (as illustrated in FIG. 1).

In particular, in the "charging" phase (configuration of FIG. 2), energy is provided from the energy source 66 (schematically illustrated) to the at least one motor/generator 17 to activate the at least one hydraulic assembly 6 that pumps the working liquid from the bottom reservoir 3 to the head reservoir 2 through the connecting conduit 4.

In the "discharging phase" (configuration of FIG. 1) the working liquid flows down from the head reservoir 2 along the connecting conduit 4 through the at least one hydraulic assembly 6 and accumulates into the bottom reservoir 3.

The energy produced during the passage through the hydraulic assembly 6 is converted by the motor/generator 17 and is transported to the grid 67 or to a different storage or electric load, for example onshore. This may be done for example by direct electric cable connection or by transporting energy first to an intermediate unit 68 and then to the grid 67. The intermediate unit 68 can be a buoyant unit.

Electric cable connection is obtained by floating or submersible cables 69.

The energy storage plant 1 comprises also a control system (not illustrated) configured to control and regulate the hydraulic assemblies 6, the valve 10, the motor/generator 17 and other controllable elements of the plant 1.

Optionally, the energy storage plant 1 can also comprise a cooling system configured to cool the working fluid if the temperature of the working fluid is greater than a threshold value (e.g. due to the friction along pipes or turbine/pump). The invention relates also to a method for performing maintenance operations on the energy storage plant 1.

Figure 7:
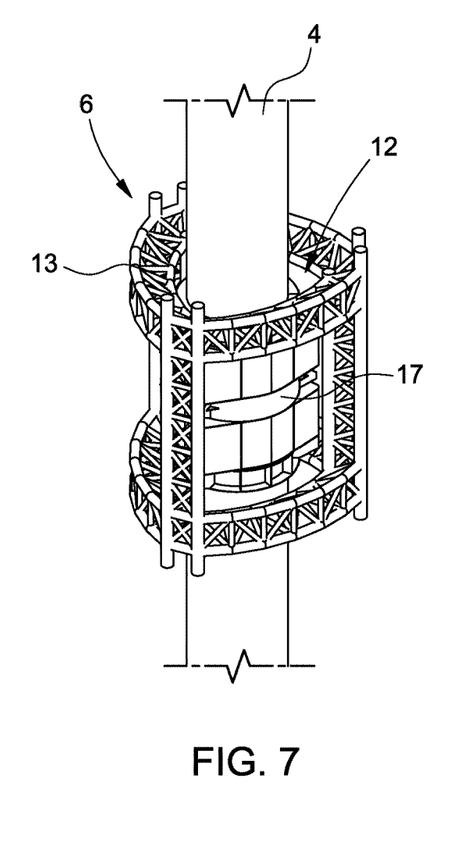
FIGS. 7-9 represent different steps of the method for performing maintenance operations on an energy storage plant according to the present invention.
Figure 8:
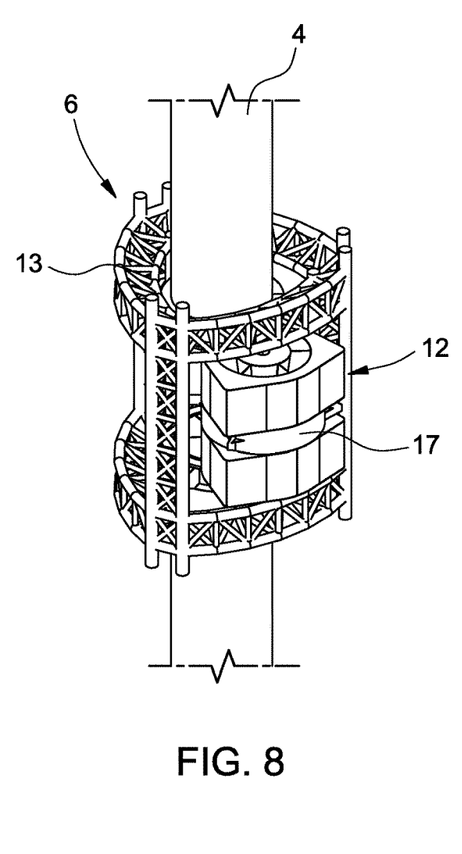
Figure 9:
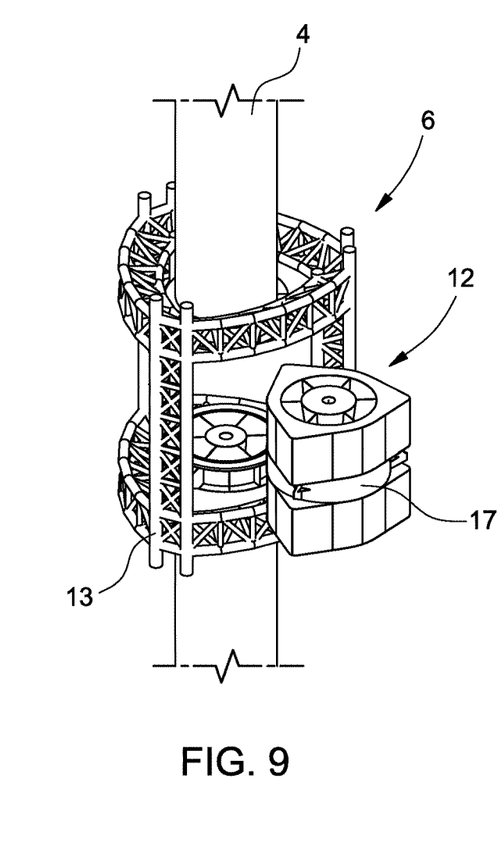

In particular, with reference to FIGS. 7-9 the method comprises decoupling the hydraulic machine 12 from the hydraulic assembly 6 and moving the detached hydraulic machine 12 away from the rest of the hydraulic assembly 6 (i.e. the frame 13) in order to perform maintenance operations on it. Normally, the detached hydraulic machine 12 is moved outside the body of water.

After the maintenance operations, the reconditioned hydraulic machine 12 is coupled to the hydraulic assembly 6 again.

In particular, the detached hydraulic machine 12 is moved through one of the windows 22 of the frame 13.

In the non-limiting example here disclosed and illustrated, also the motor/generator 17 arranged about the impeller 31 is moved along with the hydraulic machine 12.

Therefore, in the non-limiting example here disclosed and illustrated, the buoyancy chambers 46, 50, 63 are dimensioned in order to obtain a neutral buoyancy for the hydraulic machine 12 and also the motor/generator 17.

Thanks to the fact that the hydraulic machine 12 (with or without the motor/generator 17) has a neutral buoyancy, the decoupling operations and the moving of the detached hydraulic machine 12 in the body of water is safe, simple and can be performed by an underwater remotely controlled vehicle (ROV).

As the hydraulic machine 12 has a substantially neutral buoyancy, the remotely controlled underwater vehicle can be of the light category with evident advantages.

The invention relates also to a method for assembling and disassembling an energy storage plant 1.

Figure 10:
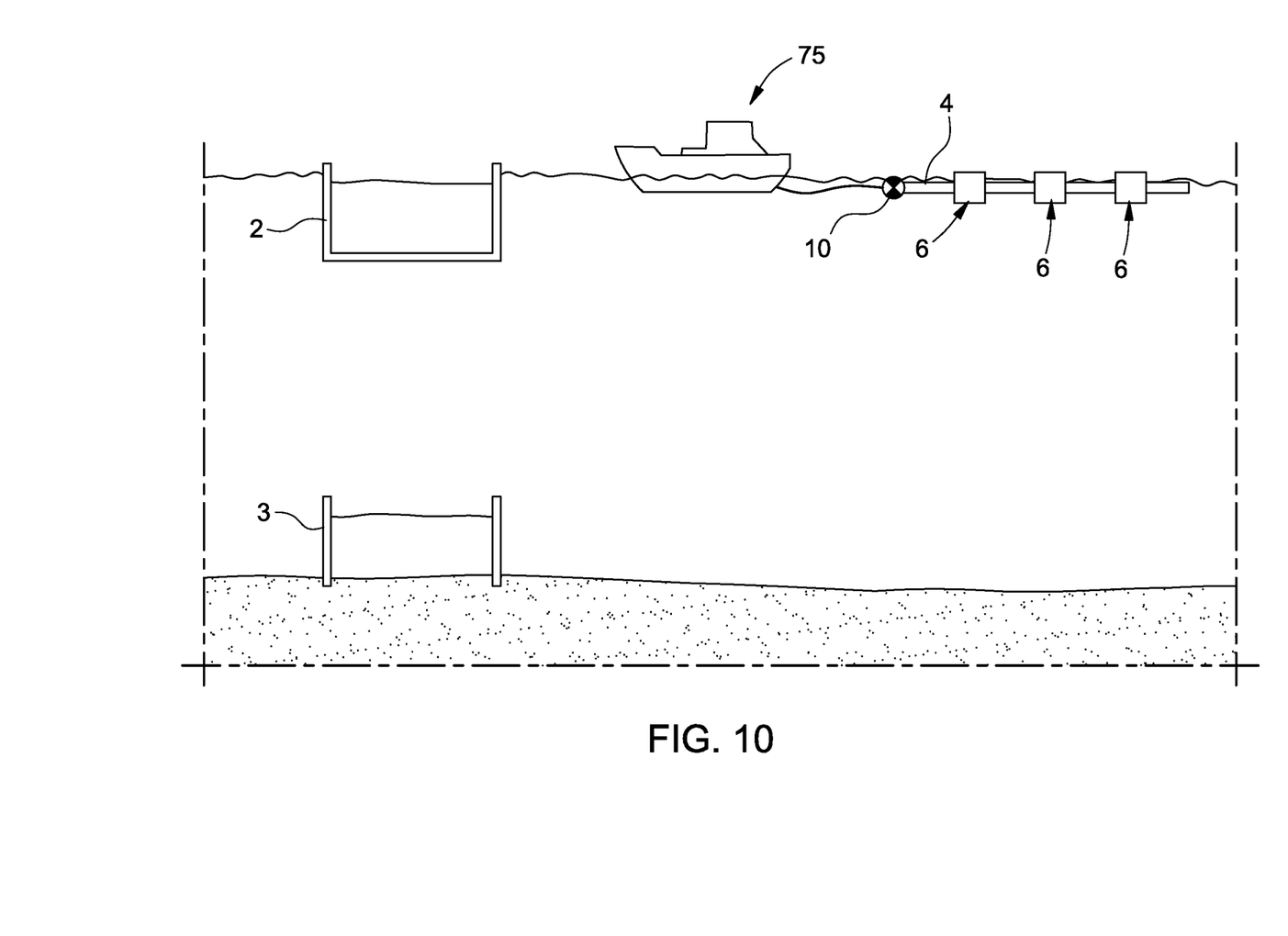
FIGS. 10-11 represent different steps of the method for assembling/disassembling an energy storage plant according to the present invention.
Figure 11:
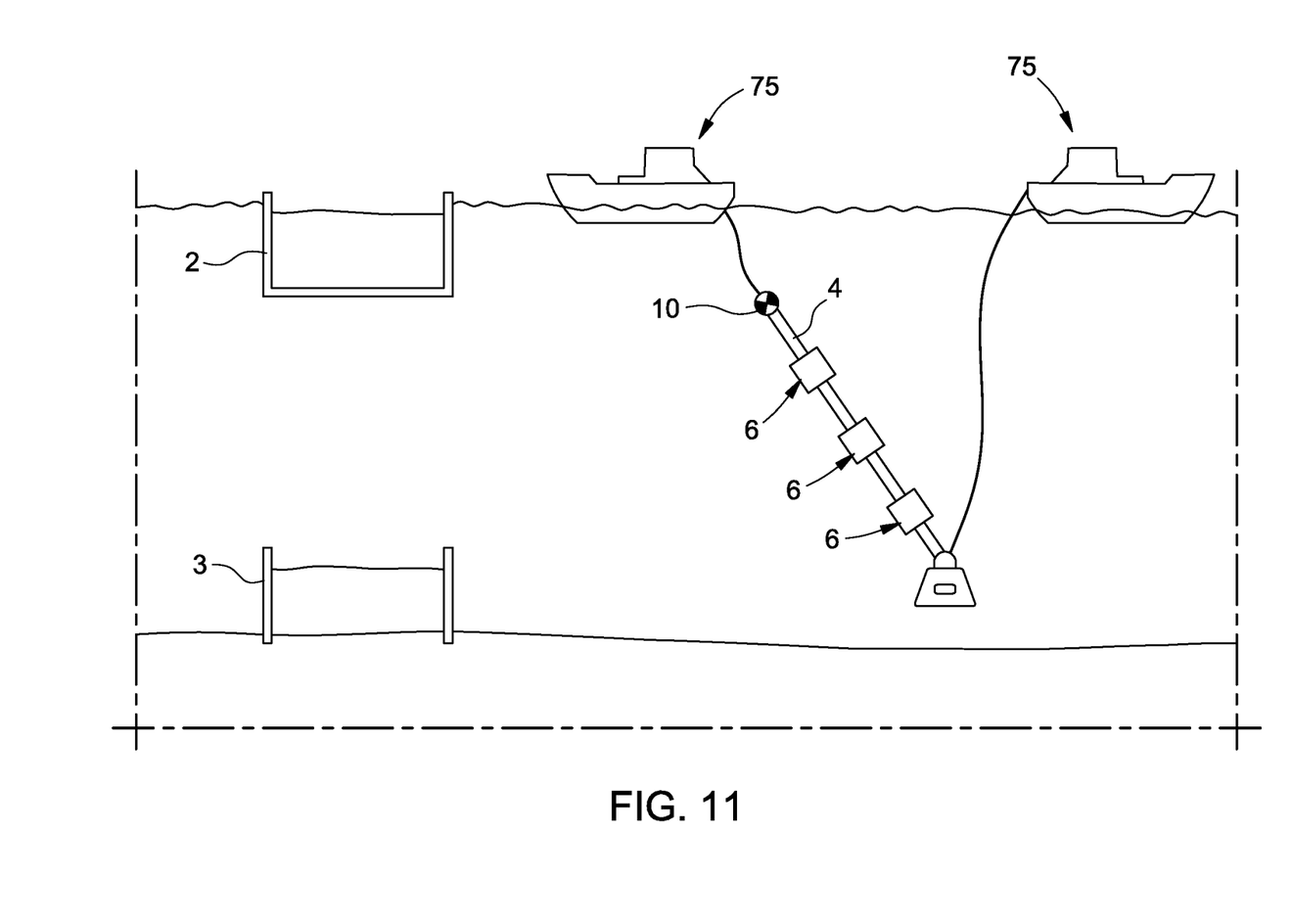

The method comprises assembling/disassembling the entire group comprising the connecting conduit 4 and the hydraulic assemblies 6 arranged along the connecting conduit 4 (i.e. in an assembled configuration). Preferably, as illustrated in FIGS. 10 and 11, the above operations of assembling/disassembling are performed on energy storage plants wherein the bottom reservoir 3 and the head reservoir 2 are already/still positioned in their operative positions.

In other words, in the assembling phase the method comprises moving from the outside of the body of water or from the surface of the body of water into the body of water the entire structure comprising connecting conduit 4 and the hydraulic assemblies 6 coupled to the connecting conduit 4.

This operation can be normally performed with crane vessels or anchor handling vessel 75 (schematically illustrated).

Once the connecting conduit 4 is positioned, the ends of the connecting conduit 4 are then coupled to the bottom reservoir 3 and the head reservoir 2. This operation can be performed with a remotely controlled underwater vehicle (not illustrated).

In the disassembling phase, the method comprises:
empting the connecting conduit 4 from the working liquid and filling it with the environmental liquid;
decoupling the ends of the connecting conduit 4 respectively from the bottom reservoir 3 and the head reservoir 2;
moving outside of the body of water or to the surface of the body of water the entire structure comprising the connecting conduit 4 and the hydraulic assemblies 6 coupled to the connecting conduit 4.

This final operation can be normally performed with crane vessels or anchor handling vessel 75.

The moving of the entire structure underwater or on the surface of the body of water may be carried out using additional ballasts or buoyant elements to momentarily change the buoyancy of the entire structure.

Thanks to the neutral buoyancy of the entire group comprising the connecting conduit 4 and the hydraulic assemblies 6 arranged along the connecting conduit 4 when the connecting conduit 4 is filled with the environmental liquid, the movements of the entire structure inside the body of water is safe and simple and requires less complicated and less expensive tools and instrumentation.

Finally, it is clear that modifications and variants can be made to the hydraulic assembly, to the energy storage plant and to the methods described herein without departing from the scope of the present invention, as defined in the appended claims.

The invention claimed is:

1. Submersible hydraulic assembly (6) for an energy storage plant (1) comprising:
   at least one hydraulic machine (12);
   at least one first buoyancy chamber (46, 50, 63) filled with at least one first buoyancy element (47, 51, 64); the at least one first buoyancy chamber (46, 50, 63) being configured such that the hydraulic machine (12) is substantially neutrally buoyant when submerged in an environmental liquid;
   wherein the hydraulic machine (12) comprises a reversible pump/turbine which extends along a longitudinal axis (B) and is provided with at least one impeller (31); the impeller (31) comprising a plurality of blades (37) radially arranged with respect to axis (B) and a central hollow hub (38) defining the at least one first buoyancy chamber (46).

2. Assembly according to claim 1, wherein the first buoyancy element (47, 51, 64) is a polymer foam.

3. Assembly according to claim 1, wherein the first buoyancy element (47, 51, 64) is air.

4. Assembly according to claim 1, further comprising at least one seat (60) configured to house a respective buoyancy body (61) configured to define the at least one first buoyancy chamber (63).

5. Assembly according to claim 4, wherein the at least one seat (60) is arranged about the hydraulic machine (12).

6. Assembly according to claim 1, wherein the hydraulic machine (12) is selected from the group consisting of a pump, a turbine, and a reversible pump/turbine.

7. Assembly according to claim 1, wherein the hydraulic machine (12) comprises a reversible pump/turbine which extends along a longitudinal axis (B) and is provided with at least one distributor (30) and an impeller (31); the at least one distributor (30) and the impeller (31) being coaxially arranged; the at least one distributor (30) being provided with a central fixed body (49), which is hollow to define the at least one first buoyancy chamber (50).

8. Assembly according to claim 1, wherein the reversible pump/turbine comprises an axial flow reversible pump/turbine.

9. Assembly according to claim 1, further comprising a frame (13), which is configured to support the hydraulic machine (12).

10. Assembly according to claim 9, wherein the frame (13) has a structure, which has a rotational symmetry.

11. Assembly according to claim 10, wherein the frame (13) has a structure, which has a 120° rotational symmetry.

12. Assembly according to claim 9, wherein the frame (13) houses the hydraulic machine (12) and is provided with at least one window (22) through which the hydraulic machine (12) can be extracted.

13. Assembly according to claim 1, further comprising at least one second buoyancy chamber (32a, 39c) filled with at least one second buoyancy element (32b, 39d); the at least one second buoyancy chamber (32a, 39c) being configured such that the hydraulic assembly (6) is substantially neutrally buoyant when submerged in an environmental liquid.

14. Assembly according to claim 13, further comprising at least two connectors (33) at respective ends of the hydraulic assembly (6); wherein each connector (33) is configured to connect the hydraulic machine (12) to a connecting conduit (4) of the energy storage plant (1); and wherein at least one of the connectors (33) is provided with a hollow central body (34) defining the at least one second buoyancy chamber (32a).

15. Energy storage plant (1) comprising:
   at least one head reservoir (2) for storing a working fluid; the head reservoir (2) being arranged at a first height;
   at least one bottom reservoir (3) for storing the working fluid; the bottom reservoir (3) being arranged at a second height lower than the first height and being submersed in an environmental liquid;
   at least one connecting conduit (4), fluidly connecting the head reservoir (2) and the bottom reservoir (3);
   at least one submersible hydraulic assembly (6) as claimed in claim 1; the submersible hydraulic assembly (6) being arranged along the connecting conduit (4) so as to intercept the working fluid flowing between the head reservoir (2) and the bottom reservoir (3); the submersible hydraulic assembly (6) being submersed in the environmental liquid.

16. Energy storage plant (1) according to claim 15, further comprising a plurality of submersible hydraulic assemblies (6) arranged along the connecting conduit (4); wherein the hydraulic assemblies (6) that are adjacent along the same connecting conduit (4) are connected to each other by means of at least two cables or chains (19); the at least two cables or chains (19) being connected to the respective hydraulic assemblies (6) so as to have different inclinations one from the other.

17. Energy storage plant (1) according to claim 16, wherein the inclinations of the at least two cables or chains (19) are substantially opposite.

18. Energy storage plant (1) according to claim 16, wherein the hydraulic assemblies (6) that are adjacent along the same connecting conduit (4) are connected to each other by means of a plurality of cables or chains (19); each cable or chain (19) of the plurality of cables or chains (19) has an inclination opposite to the inclination of the cable or chain (19) arranged at his side.

19. Method for performing maintenance operations on an energy storage plant (1) as claimed in claim 16; the method comprising the steps of:
   decoupling the hydraulic machine (12) from the hydraulic assembly (6);
   moving the hydraulic machine (12) outside the environmental liquid;
   performing the maintenance operations on the hydraulic machine (12);
   coupling again the reconditioned hydraulic machine (12) to the hydraulic assembly (6).

20. Method for assembling and disassembling an energy storage plant (1) as claimed in claim 16; wherein the submersible hydraulic assembly (6) comprises at least one second buoyancy chamber (32a, 39c) filled with at least one second buoyancy element (32b, 39d); the at least one second buoyancy chamber (32a, 39c) being configured in such a way that the hydraulic assembly (6) is substantially neutrally buoyant when submerged in an environmental liquid; wherein the connecting conduit (4) is made of a material so that the connecting conduit (4) is substantially neutrally buoyant when filled with an environmental liquid;
   the method comprising assembling/disassembling the entire assembled group comprising the connecting conduit (4) and the at least one hydraulic assembly (6) arranged along the connecting conduit (4).

21. Method according to claim 20 wherein the step of assembling/disassembling the entire group comprising the connecting conduit (4) and the at least one hydraulic assembly (6) arranged along the connecting conduit (4) is performed on an energy storage plant (1) wherein the bottom reservoir (3) and the head reservoir (2) are already/still positioned in their operative positions.

* * * * *